United States Patent
Wiercinski

(10) Patent No.: US 11,975,476 B2
(45) Date of Patent: May 7, 2024

(54) ARRANGEMENT FOR SUPPLYING A SEMI-FINISHED PRODUCT TO A THERMOFORMING MACHINE, ARRANGEMENT FOR THERMOFORMING, AND METHOD

(71) Applicant: GEISS AG, Sesslach (DE)

(72) Inventor: Miroslaw Wiercinski, Sonnefeld (DE)

(73) Assignee: GEISS AG, Sesslach (DE)

( * ) Notice: Subject to any disclaimer, the term of this patent is extended or adjusted under 35 U.S.C. 154(b) by 0 days.

(21) Appl. No.: 17/495,316

(22) Filed: Oct. 6, 2021

(65) Prior Publication Data
US 2022/0111577 A1 Apr. 14, 2022

(30) Foreign Application Priority Data
Oct. 9, 2020 (EP) ..................................... 20201131

(51) Int. Cl.
*B29C 51/44* (2006.01)
*B29C 51/20* (2006.01)
*B29C 51/32* (2006.01)

(52) U.S. Cl.
CPC .............. *B29C 51/44* (2013.01); *B29C 51/20* (2013.01); *B29C 51/32* (2013.01)

(58) Field of Classification Search
CPC ..... B29C 51/264; B29C 51/20; B29C 51/261; B29C 51/44; B29C 51/32; B29C 51/262
See application file for complete search history.

(56) References Cited

U.S. PATENT DOCUMENTS 6,367,361 B1 * 4/2002 Christensen ............ B29C 51/08
264/163
2004/0232601 A1 11/2004 Kundinger et al.

FOREIGN PATENT DOCUMENTS

| EP | 1182022 A1 | 2/2002 |
| GB | 2175868 A | 12/1986 |
| JP | 61-115632 A | 6/1986 |
| WO | 2004/091881 A2 | 10/2004 |

OTHER PUBLICATIONS

European Search Report dated Mar. 19, 2021 issued in corresponding EP 20201131 application (2 pages).

* cited by examiner

*Primary Examiner* — Monica A Huson
(74) *Attorney, Agent, or Firm* — Millen, White, Zelano & Branigan, P.C.; William F. Nixon

(57) ABSTRACT

An arrangement supplies a semi-finished product to a thermoforming machine as a starting material. The arrangement has a deposition device, on which cuttings of the starting material can be provided in each case, and a loading device having a table device and a movable loading unit. The loading unit has a first section and a second section that are each arranged to receive one of the cuttings at the section. At least one cutting can be deposited on the table device. The first section receives one of the cuttings from the deposition device and the second section receives another of the cuttings from the table device, and then the first section for depositing one cutting received from the deposition device on the table device and the second section for depositing the other cutting received from the table device can be positioned in a working region of the thermoforming machine.

14 Claims, 4 Drawing Sheets

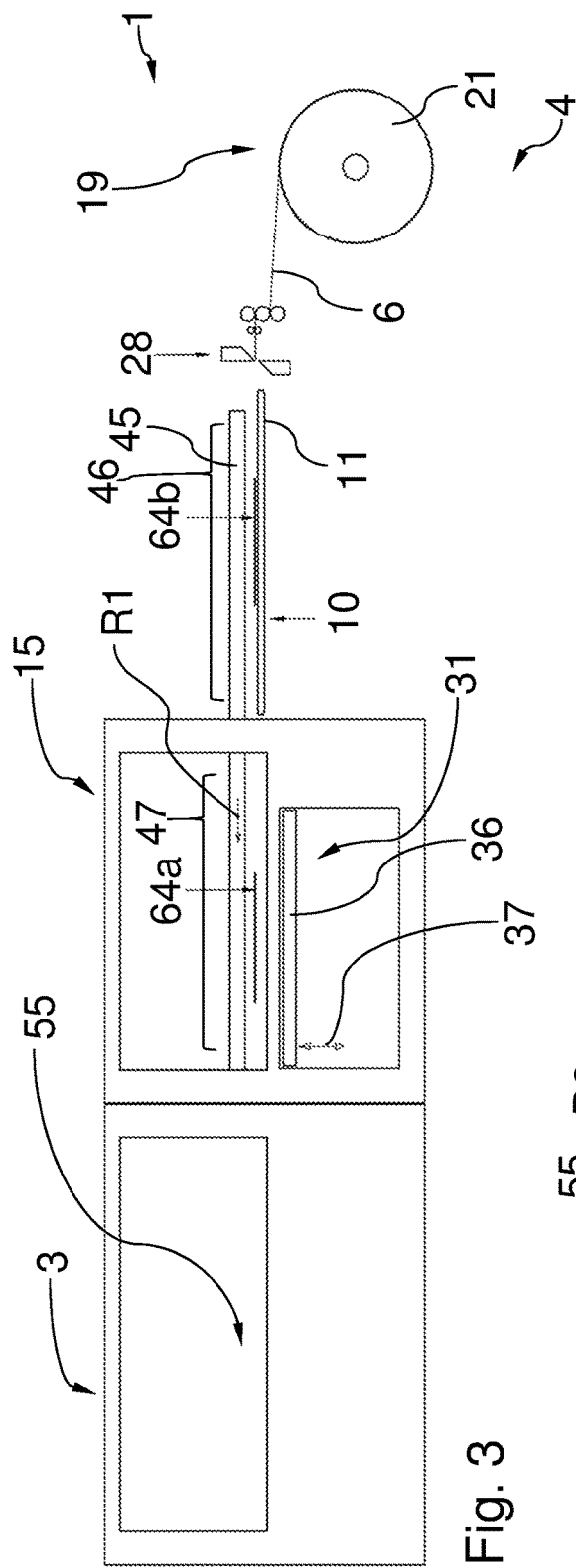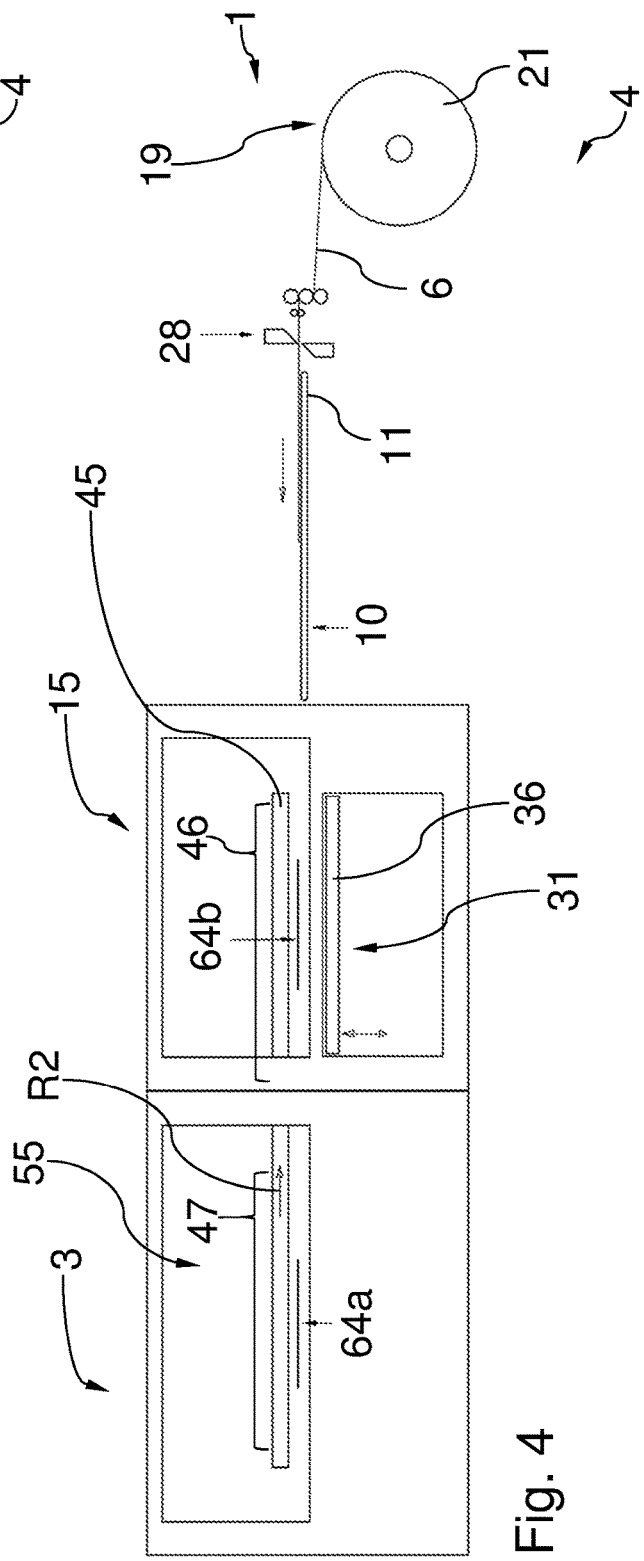

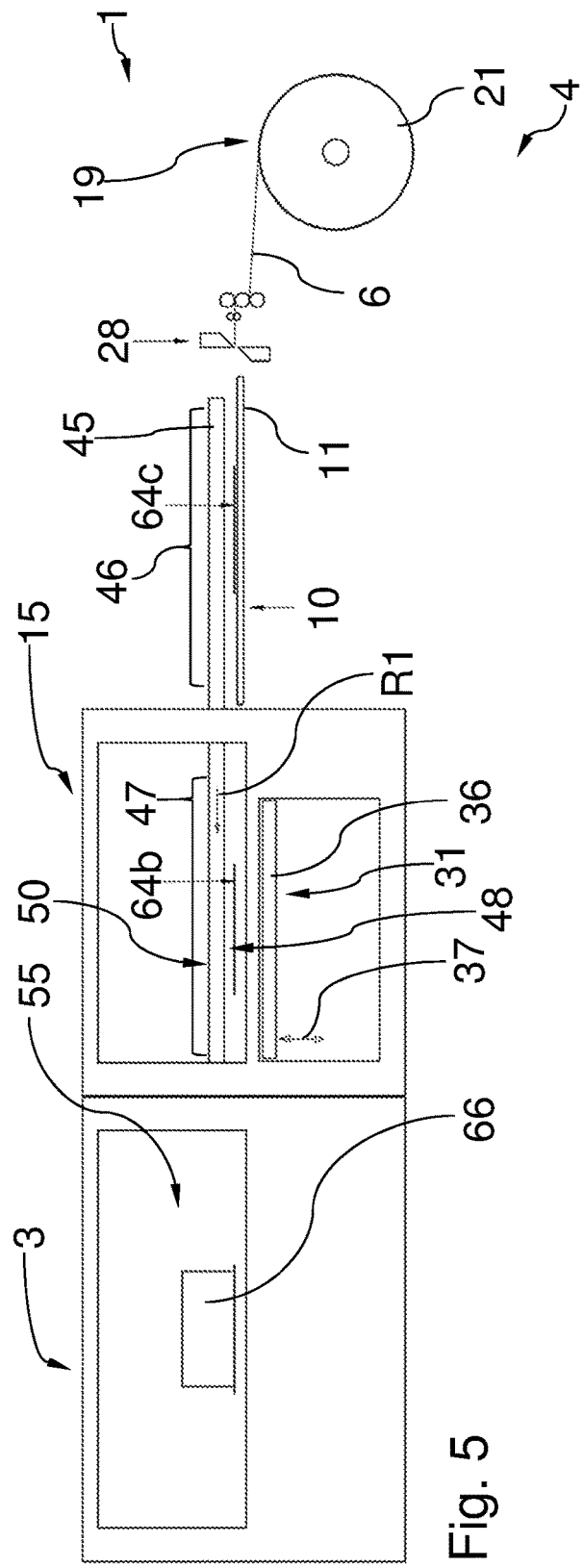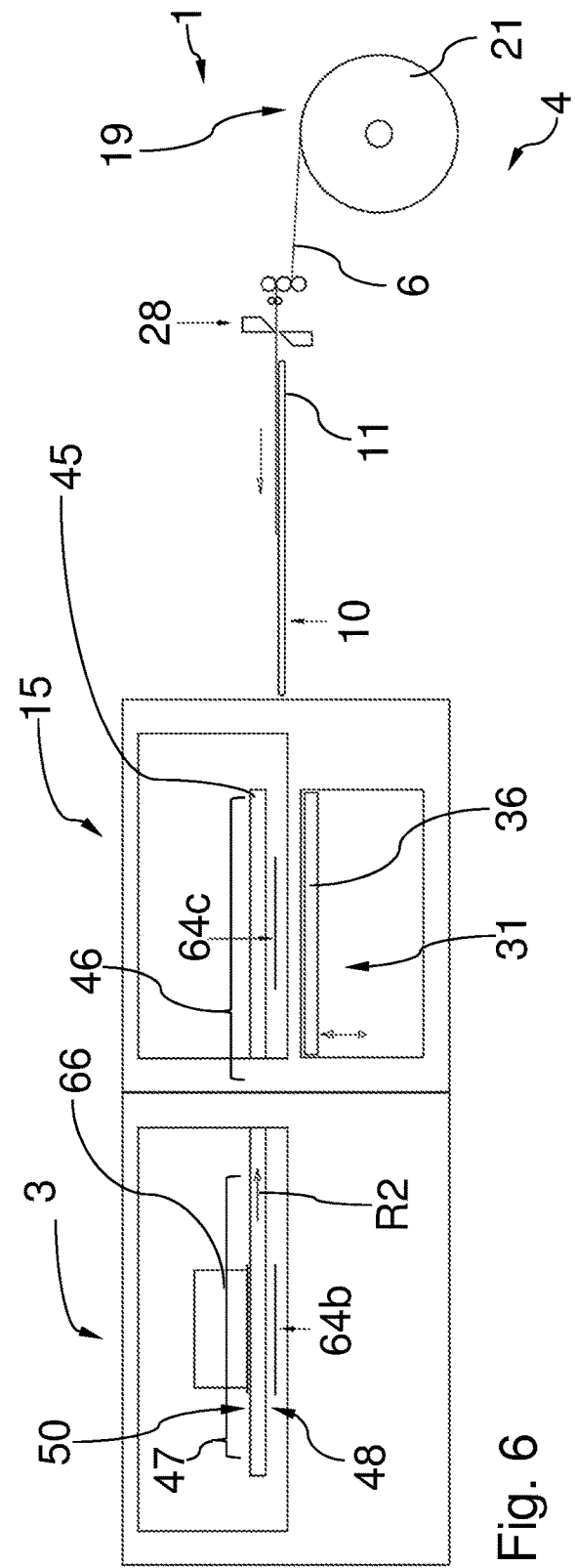

ARRANGEMENT FOR SUPPLYING A SEMI-FINISHED PRODUCT TO A THERMOFORMING MACHINE, ARRANGEMENT FOR THERMOFORMING, AND METHOD

FIELD OF THE INVENTION

The present invention relates to an arrangement for supplying a semi-finished product to a thermoforming machine as a starting material for thermoforming. The invention also relates to a thermoforming arrangement comprising such an arrangement for supplying the semi-finished product, as well as to a method for supplying a semi-finished product to a thermoforming machine as a starting material for thermoforming.

TECHNICAL BACKGROUND

Thermoforming machines make it possible to produce shaped parts from a particularly flat starting material, which is provided e.g. in the form of plastics material films or plastics material plates, using the effect of heat. This can be effected e.g. such that the starting material, e.g. a thermoplastic plastics material, is initially heated using a heating device and is thus warmed and then brought to the desired shape using a shaping tool. In each case, the starting material is a semi-finished product which is further processed by means of the thermoforming machine.

In the case of a fully automatic machine, the semi-finished product is conventionally fed to the thermoforming machine either from a roll or from plate cuttings.

For example, in a conventional arrangement, an automatic loader is provided which can receive a stack of plates, i.e. a stack of suitable two-dimensional pieces of material, on a vertically displaceable table. This stack of plates is inserted into the automatic loader. During operation, the table can move upwards in cycles, wherein a loading carriage on its underside takes the top plate from this stack and transports it into the thermoforming machine. The loading carriage then moves out of the thermoforming machine to collect the next plate from the stack. When moving into the thermoforming machine again, the loading carriage can then deposit the next plate of starting material for the following shaping process from its underside in the thermoforming machine, while at the same time the shaped part from the shaping step just completed falls onto the loading carriage and is transported out of the machine when the loading carriage moves out. Starting from a stack of plates, this approach can be used for producing shaped parts both positively, i.e. from the insertion plane upwards, and negatively, i.e. from the insertion plane downwards.

In the case of the rolled goods, the material thickness is mostly limited, but rolled goods are generally cheaper than plate goods.

In the case of a typical so-called automatic roll machine, in accordance with a conventional design, a web of material, such as a plastics material, is pulled from a roll into a thermoforming machine by means of a pin chain. After forming, the rolled goods are transported further, whereby a plurality of shaped parts are produced one after the other on the rolled goods. These shaped parts are only separated at the end of the transport procedure. The cheaper rolled goods can be used with such an approach.

However, it has been found that with such an approach, so-called negatively shaped parts either cannot be produced in an automatic way, or that this requires considerable additional mechanical outlay. Nevertheless, even in the latter case, the conventional approaches do not make it possible to fully utilise the drawing depth of the thermoforming machine when using rolled goods.

In addition, machines have already been proposed, in which rolled goods are cut during transport before or in the pin chain and then handled in this pin chain as a single plate. However, the limitations of the conventional roll principle, as described above, are not overcome in this way.

In addition, when using a pin chain, piercing the transported material can produce material particles or splinters, which in many cases can be disruptive and at least can make the production of high quality shaped parts, particularly shaped parts having a high surface quality, more difficult or more costly.

In addition, plate cuttings of a plastics material which have been stacked up in advance to form a stack can attract dirt particles or dust due to electrostatic charging, which in turn can be undesirable when producing particularly high-quality shaped parts.

SUMMARY OF THE INVENTION

Against this background, the object of the invention is to further improve the supplying of a semi-finished product to a thermoforming machine as a starting material and in so doing to overcome at least some of the aforementioned disadvantages of conventional approaches.

In accordance with the invention, this object is achieved by an arrangement having the features as disclosed herein or by a method having the features as disclosed herein.

An arrangement for supplying a semi-finished product to a thermoforming machine as a starting material for thermoforming is proposed, wherein the arrangement has a deposition device, on which cuttings of the starting material can be provided in each case. Furthermore, the arrangement has a loading device which has a table device and a movable loading unit. The loading unit has a first section and a second section, the first and second sections each being arranged to receive one of the cuttings at the section. At least one of the cuttings can be deposited on the table device. In this case, the first section can be positioned to receive one of the cuttings from the deposition device and the second section can be positioned to receive another of the cuttings from the table device. Then, the first section for depositing one cutting received by the deposition device on the table device and the second section for depositing the other cutting received by the table device can be positioned in a working region of the thermoforming machine.

Also proposed is an arrangement for thermoforming with a thermoforming machine as well as with such an arrangement for supplying a semi-finished product in order to supply the semi-finished product to the thermoforming machine as a starting material for thermoforming.

Furthermore, a method is proposed for supplying a semi-finished product to a thermoforming machine as a starting material for thermoforming, the method comprising:
 providing a cutting of the starting material on a deposition device;
 receiving the cutting provided on the deposition device from the latter by a first section of a movable loading unit of a loading device;
 moving the loading unit in a first direction;
 depositing the cutting received at the first section by the deposition device on a table device of the loading device;
 moving the loading unit in a second direction;

receiving the cutting deposited on the table device from the table device by a second section of the loading unit; moving the loading unit in the first direction once again; depositing the cutting received at the second section by the table device in a working region of the thermoforming machine.

A concept addressed by the invention is that of equipping the loading unit with the first and the second section and thus with two stations for receiving cuttings. By using the movable loading unit, which allows a cutting to be deposited in the working region of the thermoforming machine, it is possible to effect production both positively and negatively starting from the insertion level without restriction and fully utilising the drawing depth of the thermoforming machine. In particular, by providing the cuttings, which are processed one after the other, in each case on the deposition device, production can be effected with a uniform process and with uniform handling of the shaped part, regardless of whether plate goods or rolled goods are used as the starting semi-finished product. Moreover, the invention can also avoid the often undesirable formation of material particles or splinters, which can occur when using a pin chain. Furthermore, if necessary or desired, the provision of the individual cuttings can in some cases be preceded in particular by special individual treatment of the cuttings, such as cleaning.

The method in accordance with the invention can be performed in particular by means of the supplying arrangement in accordance with the invention.

Advantageous embodiments and developments of the invention are apparent from the dependent claims and from the description with reference to the drawings.

In one embodiment, the arrangement has an unrolling device arranged upstream of the deposition device for unrolling rolled goods. Thus, it is advantageous for production to be effected from the rolled goods, thus making use of cost advantages of the rolled goods. At the same time, a uniform process and handling of the finished shaped parts can be effected in a similar manner to thermoforming starting from plate goods. The drawing depth of the thermoforming machine can also be used in an advantageous manner during production starting from rolled goods.

According to a further embodiment, the arrangement has a separating device, in particular a cutting device, which is arranged for separating a piece of the rolled goods which has been unrolled in sections by means of the unrolling device and, in particular, has been deposited at least in sections on the deposition device in order to form the cuttings of the starting material. Thus, the cutting of the cuttings can be performed directly before they are processed, e.g. in a cycled manner according to the working cycle of the thermoforming machine.

In particular, the separating device is arranged downstream of the unrolling device.

In one embodiment, the arrangement for providing the cuttings of the starting material on the deposition device is arranged in each case as a cutting of plate goods. This makes it possible to manufacture the shaped parts starting from plate goods, e.g. if the material thickness is too great, in order to provide the starting material as rolled goods. Advantageously, a further work station, e.g. a cleaning apparatus, can be located upstream of the provision of the cutting on the deposition devices. In this embodiment, the plate goods is thus introduced externally, i.e. from an external source, and the cuttings are provided in particular individually and preferably in an at least partially automated manner on the deposition device. In addition, even in cases where the starting material would allow rolling up in terms of its material thickness, the cutting can likewise be delivered as pre-cut plate goods.

In particular, the first and second sections are positioned by means of moving the loading unit, wherein the first and second sections can be moved in particular jointly with one another during operation of the arrangement. In other words, the first and second sections are thus preferably provided in a mutually fixed spatial arrangement on the loading unit.

In a further development, provision is made that the loading unit is movably arranged in such a way that, in a first position of the loading unit, the first section of the loading unit is positioned for receiving one of the cuttings from the deposition device and, at the same time, the second section of the loading unit is positioned for receiving the other of the cuttings from the table device, and/or that the loading unit is movably arranged in such a way that, in a second position of the loading unit, the first section of the loading unit is positioned for depositing one cutting on the table device and, at the same time, the second section of the loading unit is positioned for depositing the other cutting in the working region of the thermoforming machine. In this way, an efficient, cycled mode of operation can be achieved, wherein e.g. in a first cycle the receiving is effected from the deposition device and simultaneously from the table device, while in a subsequent cycle, after moving the loading unit, the depositing on the table device or in the working region of the thermoforming machine again is effected simultaneously.

In one embodiment, the loading unit is designed as a movable loading carriage. A movement of the loading unit can thus be achieved in a simple and expedient manner.

In one embodiment, the movable loading unit can be moved above the table device and the deposition device. Preferably, the movable loading unit can be moved along a substantially horizontal direction. In this way, it is advantageously possible to receive the cuttings at the loading unit from below at its first and second sections, wherein the cuttings can be deposited or made available on the table device and the deposition device, in each case in particular substantially horizontally, for instance on a substantially horizontal surface.

According to one embodiment, the first and second sections of the loading unit are arranged one behind the other along a movement direction of the loading unit. This facilitates positioning of the sections by means of moving the loading unit.

In particular, provision is made that the first section can be positioned above the deposition device and moreover the first and second sections can each be positioned above the table device.

In one embodiment, the cuttings on the first and second sections of the loading unit can each be received on an underside of the loading unit, wherein the loading unit is equipped with receiving means, in particular in the region of the underside thereof.

In one embodiment, the receiving means can be designed e.g. as suction devices.

In one embodiment, the loading device is designed and arranged such that the second section of the movable loading unit can be moved into the working region of the thermoforming machine. This can contribute to reliable deposition of the cutting in the working region at the correct position. Furthermore, this contributes to efficient removal of a finished shaped part.

In one embodiment, the loading device is designed in such a way that a shaped part which is produced by means of thermoforming from a cutting deposited beforehand in the working region of the thermoforming machine and is then demoulded can be deposited on an upper side of the loading unit, in particular in that position of the loading unit in which the loading unit is positioned for depositing the other cutting in the working region of the thermoforming machine. The demoulded shaped parts can thus be transported out of the working region individually one after the other without complicating the transport and deposition of the subsequent cutting. For example, the finished shaped part can be lifted by a clamping frame of the thermoforming machine so that the loading unit can be moved in between the demoulded shaped part and an insertion or clamping plane for the next cutting. It is thus possible to mould shaped parts both positively and negatively in relation to this plane, i.e. upwards or downwards, without the drawing depth being restricted by the transport procedure.

In one embodiment, the deposition device can be designed as a table.

In a preferred embodiment, the deposition device is designed having a transport device, e.g. having a belt-type transport device. This can improve the handling of the semi-finished product, in particular when provided as rolled goods. This embodiment can contribute to correct positioning and provision of the cutting, e.g. without undesired folds or the like.

In particular, the transport device of the deposition device provides a movable, preferably substantially horizontally movable, deposition surface which extends preferably substantially horizontally.

In one embodiment, the table device of the loading device is designed having a movable table. The table can be movable in particular transversely to a movement direction of the loading unit. In particular, the table can be moved substantially along a vertical direction. This makes it possible to adjust the height of a surface of the table, on which the cutting can be deposited. Moreover, with this embodiment, the arrangement can be operated according to a further operating mode, in which a stack of already prepared, stacked cuttings of a starting material for thermoforming is arranged on the table. These cuttings can be removed individually one after the other from the stack by means of the loading unit, in particular by means of the second section thereof, and can be transported into the working region of the thermoforming machine. Therefore, in this example operating mode the first section is not used. The stack can be deposited either directly on the table or on a pallet which, in turn, is arranged on the table. This embodiment thus makes it possible to operate the arrangement in at least two different operating modes, on the one hand with external provision of a cutting, e.g. starting from rolled goods during the production procedure, or externally as individual cuttings, or alternatively with provision of a stack of already finished cuttings, for instance plate goods. The arrangement can thus be operated in a very flexible manner.

In some embodiments, the table could e.g. be movable in cycles. This can be useful for an operating mode, in which thermoforming is effected starting from a stack of cuttings.

However, in other embodiments the table device can have a fixedly arranged table. This can simplify the design of the loading device, for instance for applications, in which the use of stacks of cuttings of a starting material is not provided.

In particular, the deposition device is arranged upstream of the loading device. For example, the deposition device can be arranged in this case outside the loading device.

Furthermore, in a preferred embodiment the loading device is arranged upstream of the thermoforming machine and/or is arranged spatially next to the thermoforming machine.

By means of the thermoforming machine, the starting material in the working region can be subjected to thermoforming in order to produce shaped parts. The starting material fed to the thermoforming machine as the semi-finished product is e.g. film or plate goods, in particular a plastics film material or plastics plate goods.

The thermoforming machine is designed in particular as a closed-chamber thermoforming machine which has a machine housing which is closed and sealed during operation. However, the invention can likewise be used in conjunction with thermoforming machines of a different type.

In one embodiment of the arrangement for thermoforming, the loading device is arranged between the thermoforming machine and the deposition device.

In particular, in the method for supplying a semi-finished product to the thermoforming machine, the second direction, in which the loading unit is moved, is in parallel with and opposite to the first direction.

In one embodiment of the method, while the cutting deposited on the table device is being received by the second section of the loading unit, a further cutting provided on the deposition device is received by the first section of the loading unit, in particular simultaneously. Preferably, while the cutting received at the second section is being deposited in the working region of the thermoforming machine, the further cutting received at the first section is deposited on the table device, in particular simultaneously. Again, an efficient, cycled mode of operation can be achieved.

In one embodiment, in order to provide the cutting of the starting material on the deposition device, a piece of a starting material provided as rolled goods is unrolled, in particular deposited on the deposition device at least in sections, and is separated from the remaining rolled goods in order to form the cutting.

In an alternative embodiment, the cutting of the starting material is provided on the deposition device as a cutting of plate goods.

The advantages of providing the starting material as rolled or plate goods have already been explained above.

The above embodiments and developments can be combined with each other in any manner if it is useful to do so. Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the invention.

The embodiments and further developments described above can be applied in a similar manner to the arrangement for supplying a semi-finished product to a thermoforming machine, to the arrangement for thermoforming, and to the method for supplying a semi-finished product.

CONTENT OF THE DRAWINGS

The invention will be explained in more detail hereinafter with the aid of the exemplified embodiments shown in the schematic figures. In the drawing:

FIG. 3 shows the arrangement of FIG. 1 in a third cycle following the second cycle;

FIG. 4 shows the arrangement of FIG. 1 in a fourth cycle following the third cycle;

FIG. 5 shows the arrangement of FIG. 1 in a fifth cycle following the fourth cycle;

FIG. 6 shows the arrangement of FIG. 1 in a sixth cycle following the fifth cycle;

Figure 1:
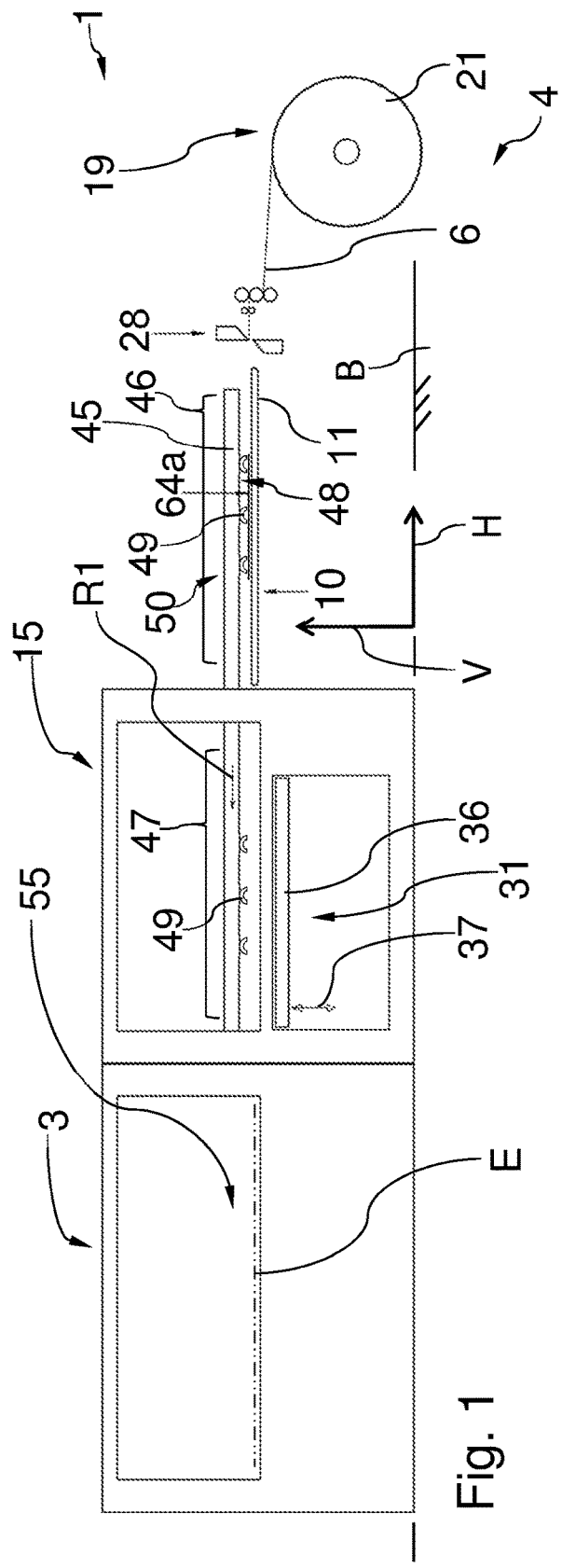
FIG. 1 shows an arrangement according to one exemplified embodiment, in a schematic side view, in a first cycle at the start of the production of shaped parts.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures of the drawings, like and functionally identical elements, features and components and elements, features and components acting in an identical manner are provided with the same reference signs, unless indicated otherwise.

DESCRIPTION OF EXEMPLIFIED EMBODIMENTS

FIG. 1 shows an arrangement 1 for thermoforming, having a thermoforming machine 3 and an arrangement 4, allocated to the thermoforming machine 3, for supplying a semi-finished product as the starting material 6 for thermoforming to the thermoforming machine 3. In FIG. 1, rolled goods are used as the semi-finished product which is fed as the starting material 6.

The arrangement 4 comprises a deposition device 10 and a loading device 15. Furthermore, the arrangement 4 in FIG. 1 comprises an unrolling device 19 for unrolling the rolled goods from a roll 21, and a separating device 28 for separating pieces of the rolled goods.

In FIG. 1, the thermoforming machine 3, the loading device 15 and the deposition device 10 are arranged next to one another in this order along a horizontal direction H and set up on a substantially horizontal floor B, wherein a support frame or the like for the deposition device 10 is not illustrated in FIG. 1 for a better overview. Thus, in FIG. 1 the loading device 15 is arranged next to and adjoining the thermoforming machine 3, wherein the deposition device 10 is provided outside the loading device 15 and upstream thereof and adjacent thereto.

The separating device 28 and the unrolling device 19 are provided upstream of the deposition device 10 in the horizontal direction H. Therefore, the separating device 28 is arranged downstream of the unrolling device 19 along the conveying path of the starting material 6 between the unrolling device 19 and the deposition device 10. For a better overview, housings or support frames for the separating device 28 and the unrolling device 19 are each likewise not illustrated.

On the roll 21, the semi-finished product is delivered as rolled goods and starting material 6 for thermoforming in the thermoforming machine 3. In particular, the starting material 6 is a plastics material film, e.g. formed with a thermoplastic plastics material. The price of rolled goods is often cheaper than plate goods.

The loading device 15 has a table device 31 which is designed having a movable table 36 which can be moved substantially along a vertical direction V. In FIG. 1, the movement capability of the table 36 is indicated schematically by an arrow 37.

Furthermore, the loading device 15 has a movable loading unit 45 which is designed as a movable loading carriage and can be moved above the table device 36 and the deposition device 10 substantially along the horizontal direction H. The loading unit 45 has a first section 46 and a second section 47 which are arranged along the horizontal direction H and thus along a direction of movement of the loading unit 45 one behind the other and in a fixed spatial relationship with respect to one another on the loading unit 45.

In the region of an underside 48 of the loading unit 45, said loading unit is equipped within the sections 46 and 47 respectively with receiving means 49 which are arranged for receiving cuttings 64, 64a-c of the starting material 6. For example, the receiving means 49 can each be designed as suction devices. Only a few of the receiving means 49 are schematically indicated for each of the sections 46, 47 in FIG. 1, in FIGS. 2-8 the receiving means 49 are not shown for a better overview.

By way of example, the thermoforming machine 3 of FIG. 1 is a closed-chamber thermoforming machine. FIG. 1 shows a working region 55 of the thermoforming machine 3, as well as an insertion or clamping plane E for the starting material 6 which is thermoformed. The insertion plane E is schematically drawn with a double dotted line in FIG. 1. Located in the thermoforming machine 3 below the insertion plane E is a machine housing which is closed and sealed during operation of the thermoforming machine 3. For a better overview, a moulding tool and a clamping frame which is movable in particular above the insertion plane E and also serves in particular to fixedly clamp the starting material 6 approximately in the plane E are also not illustrated in greater detail in FIG. 1. A heater for heating the material to be thermoformed is likewise not shown.

The mode of operation of the arrangement 1 of FIG. 1 is explained hereinafter.

In order to supply the semi-finished product to the thermoforming machine 3 as the starting material 6 for thermoforming, a piece of the rolled goods on the roll 21 is firstly unrolled by means of the unrolling device 19. During unrolling, the starting material 6, i.e. at least part of the unrolled piece thereof, is deposited in sections on the deposition device 10. The procedure is illustrated graphically in FIGS. 2, 4 and 6 for subsequent working cycles.

The deposition device 10 has a belt-like transport device 11 which is designed by way of example as a drivable endless belt and provides a horizontal deposition surface which is movable in the horizontal direction H in the region of an upper side of the transport device 10. The unrolled piece of the starting material 6 can be reliably deposited here in order to be subsequently transferred as a cutting to the loading unit 45.

If the desired quantity of starting material 6 has been unrolled and deposited on the deposition device 10, the deposited piece is cut off from the rest of the rolled goods by means of the separating device 28 which in FIG. 1 is designed as a cutting device, whereby a cutting 64a is provided on the deposition device 10 and is subsequently subjected to thermoforming in the thermoforming machine 3 in order to produce a shaped part 66.

In the cycle of FIG. 1, corresponding to an operating step in which the first cutting 64a is fed to the thermoforming machine 3, the cutting 64a is received at the first section 46 by means of the receiving means 49. In this case, the first section 46 forms a type of "extension" of the loading carriage 45, protrudes from the loading device 15 in the basic position or first position of the loading unit 45 shown in FIG. 1 on the side of the loading device 15 facing away from the thermoforming machine 3, and extends horizontally across the deposition device 10. FIG. 1 shows that in this step the cut film cutting 64a of the rolled goods is transferred to the underside 48 in the region of the first section 46 and thus the "extension" of the loading unit 45.

Figure 2:
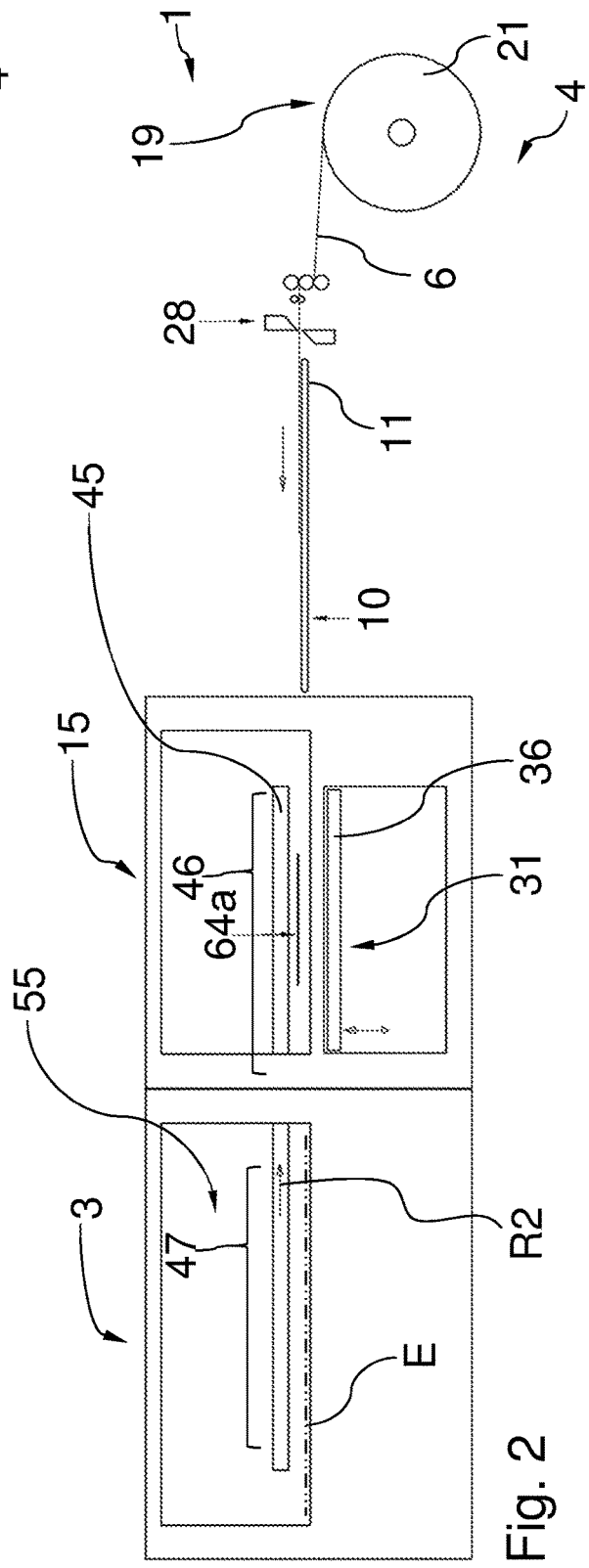
FIG. 2 shows the arrangement of FIG. 1 in a second cycle following the first cycle.

After the cutting 64a has been received at the first section 46 positioned above the deposition device 10, the loading unit 45 is moved in a direction R1 in parallel with the horizontal direction H such that the loading unit 45 is moved from the first position, in which the first section 46 is positioned to receive the cutting 64a from the deposition device 10, to a second position, in which the first section 46 is positioned above the table 36 of the table device 31 in order to deposit the cutting 64a on a substantially horizontal surface of the table 36. FIG. 2 shows the loading unit 45 after moving in the direction R1. In the second cycle shown in FIG. 2, the cutting 64a of the film material is deposited in the loading device 15 on its table device 31.

The table 36 can be arranged to receive, in another operating mode to be explained in greater detail later, a stack of cuttings, in particular cuttings of plate goods, wherein this stack can be arranged on the table 36 directly or by means of a pallet provided for this purpose. However, in the operating mode shown in FIGS. 1-6, there is no such stack, instead the cutting 64a received at the first section 46 in the first cycle is deposited individually on the table 36 in the second cycle of FIG. 2, wherein the stack of plates could be loaded in the other operating mode.

In the meantime, see FIGS. 2, 3, a further cutting 64b is provided on the deposition device 10 by unrolling and cutting by means of the unrolling device 19 and the separating device 28. After completion of the second cycle of FIG. 2, the loading unit 45 moves in a second direction R2 opposite to the first direction R1 and substantially in parallel with the horizontal direction H with the first section 46 over the deposition device 10.

In the third cycle of FIG. 3, the movable loading unit 45 is then located in the first position in which the first section 46 is positioned above the deposition device 10. At the same time, when the loading unit 45 is in the first position the second section 47 is positioned over the table device 31. In the third cycle of FIG. 3, the first section 46 can thus take the further cutting 64b, which was preferably provided in an automated manner on the deposition device 10 during the preceding cycle, from the deposition device 10. At the same time, the cutting 64a deposited on the table 36 of the table device 31 in the second cycle is then received by the second section 47 from the table device 31. This occurs in a similar manner to the receiving at the first section 46 with the aid of the receiving means 49 which are also provided in the region of the second section 47 and can be designed e.g. as suction devices but are not illustrated in greater detail in FIG. 3.

Thus, in FIG. 3, while in the first position the first section 46 is positioned to receive the cutting 64b from the deposition device 10, at the same time the second section 47 is positioned to receive the other cutting 64a from the table device 31. In FIG. 3, the cutting 64b is received by the deposition device 10 at the first section 46 and the other cutting 64a deposited beforehand on the table device 31 is received at the second section 47.

Then, the loading unit 45 moves in the direction R1 to the second position, in which the second section 47 is displaced into the working region 55, see FIG. 4. In the fourth cycle of FIG. 4, the cutting 64b received beforehand at the first section 46 from the deposition device 10 is deposited on the table device 31, in particular on the table 36, and at the same time the cutting 64a received beforehand at the second section 47 from the table device 31, in particular the table 36, is deposited in the working region 55 of the thermoforming machine 3 in the plane E. While the cuttings 64b, 64a received at the sections 46, 47 are being deposited, a further cutting 64c is provided on the deposition device 10, as illustrated in FIG. 4. This occurs in a similar manner to the above-described provision of the cuttings 64a, 64b on the deposition device 10.

The loading device 15 is designed in such a manner that a shaped part 66 can be deposited on an upper side 50 of the loading unit 45, at least in a part thereof allocated to the second section 47. This is illustrated in FIGS. 5 and 6 which show two further cycles of the operation of the arrangement 1 which follow on from FIG. 4. The procedures in FIG. 5 correspond to those described in relation to FIG. 3, the procedures in FIG. 6 correspond to those described in relation to FIG. 4, with the exception that in the operating state of FIG. 5 in the working region 55 of the thermoforming machine 3 there is now already a shaped part 66 which was produced by thermoforming from the cutting 64a deposited in the working region 55 in the fourth cycle. The demoulded shaped part 66 is gripped by the clamping frame, not shown in greater detail in the figures, and is raised in the vertical direction V. Then, the loading unit 45 moves horizontally in the direction R1, see FIG. 5, with the second section 47 into the working region 55. In this case, the loading unit 45 supports a cutting 64c and 64b on its underside 48, in turn, in the first section 46 and the second section 47 respectively. In the state shown in FIG. 6, the clamping frame has dropped or deposited the shaped part 66 onto the upper side 50 of the loading unit 45, while at substantially the same time the cutting 64b received beforehand at the second section 47 from the table device 31 is deposited in the working region 55 for the next shaping procedure.

During the further production of successive shaped parts 66, the cycles or method steps shown in FIGS. 5 and 6 are repeated alternately, whereby cuttings 64 of the starting material 6 are successively transported into the working region 55 and finished shaped parts 66 are transported out of said working region by means of the loading unit 45. The finished shaped parts 66 can be removed from the loading device 15 e.g. in the position of the loading unit 45 shown in FIG. 5. A multiplicity of shaped parts 66 are manufactured in this manner.

It can be seen that the loading unit 45 thus has two "stations" which are formed by the first and second sections 46, 47 which each serve to receive one of the cuttings 64a, 64b, 64c, . . . .

It has already been described above that the table 36 can be moved in the direction of movement 37 substantially in parallel with the vertical direction V and thus transversely to the horizontal directions of movement R1, R2 of the loading unit 45. In particular, the table 36 can be moved in a cycled manner.

Figure 7:
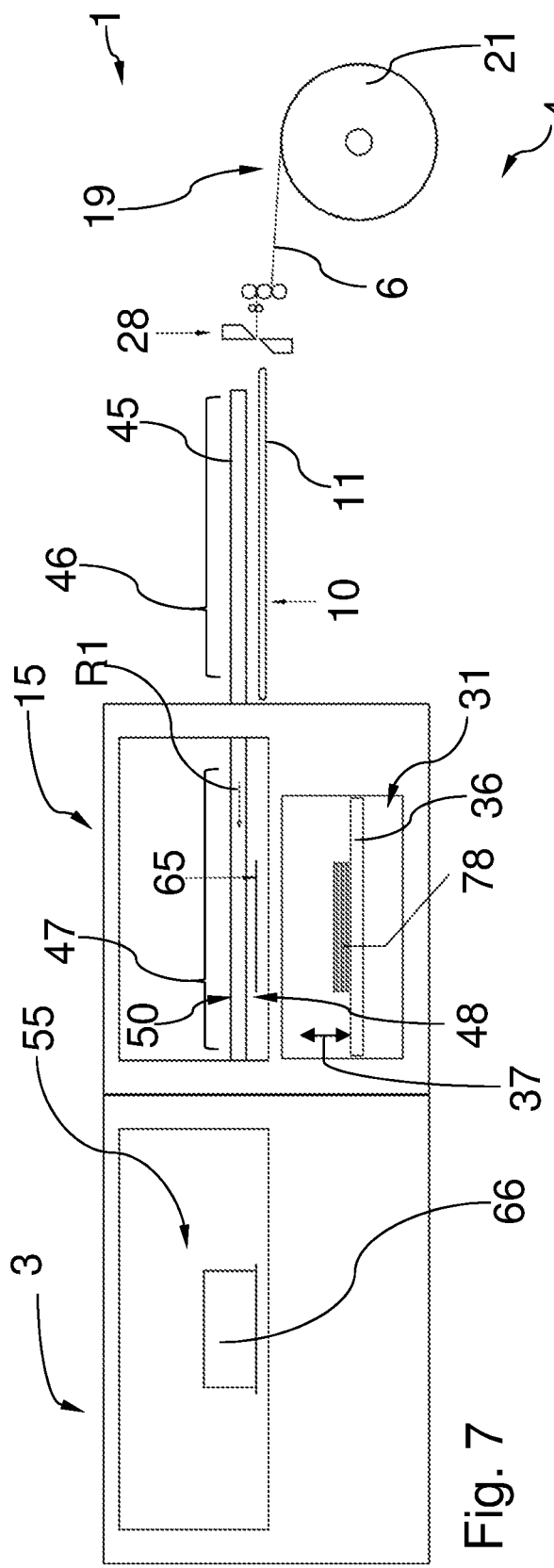
FIG. 7 shows an arrangement according to FIG. 1 during operation in an alternative operating mode.

FIG. 7 illustrates that in another operating mode of the arrangements 1, 4, which is modified with respect to that of FIGS. 1-6, a stack 78 of a multiplicity of material cuttings of a starting material, such as a plate stack, is arranged on the table 36. In this operating mode, the cuttings provided as plate stacks 78 are processed by thermoforming to form the shaped parts 66.

The unrolling device 19 is not used in the example operating mode of FIG. 7. The separating device 28 is also not actuated in this operating mode. No cuttings 64 are received at the first section 46 in the operating mode of FIG. 7. Instead, individual cuttings 65 are received successively in each case from the upper end of the stack 78 at the second section 47, then the second section 47 is displaced into the working region 55 by moving the loading unit 45 in the direction R1 in order to deposit the cutting 65, which was received beforehand from the stack 78 at the second section 47, in the working region 55, and at the same time to receive the finished shaped part 66 of the preceding working cycle on the upper side 50 of the loading unit 45.

In the operating mode of FIG. 7, the table 36 can be moved upwards in cycles. Although the stack 78 is shown in FIG. 7 as being placed directly on the table 36, it is conceivable to arrange the stack 78 on a suitable pallet (not shown in the figures) and then place the pallet on the table 36 before the operation of the arrangement 1 is started. The additional height of the pallet is then taken into account e.g. when the table 36 is moved.

Moreover, it is understood that in the operating mode of FIGS. 1-6, a cutting 64 can either be directly deposited substantially horizontally on the table 36 in order then to be received from the table 36 in the next step, or that an intermediate element can be arranged on the table 36 if required, which is then preferably fixed to the table 36 and on which the cutting 64 is deposited horizontally. Such an intermediate element can then be considered to be part of the table device 31.

Such an arrangement 1 with the vertically movable table 36 advantageously allows operation in several operating modes—supplying the starting material 6 as a semi-finished product from the roll 21 and successively cutting the cuttings 64, or alternatively supplying cuttings by receiving them from a previously provided stack 78 of plate or film cuttings. The arrangement 1 can thus be used very flexibly.

In variants of the arrangement 1, as described above with reference to FIGS. 1-6, it is conceivable that the table 36 of the table device 31 is stationary, without the possibility of a vertical movement capability. The structure of the loading device 15 can be simplified in this manner.

In the arrangement 1, both the cutting 64a, 64b, 64c, . . . and the shaped part 66, when fed into or removed from the thermoforming machine 3, can be treated in a similar and thus uniform manner in the various operating modes, irrespective of whether plate goods or rolled goods are used as the starting material. Moreover, it is possible to avoid any impairment of the achievable drawing depth, both in a positive and in a negative direction, calculated from the plane E, by virtue of the transport operations with the arrangement 4, as described above.

Advantageously, in the arrangement 1 of FIGS. 1-7, rolled goods can be used if the desired starting material 6 is available as rolled goods. If the starting material 6 is e.g. too thick to be delivered on a roll, it is alternatively possible to use the plate stack 78. Thus, the arrangement 1 makes it possible to utilise the price advantage of rolled goods whilst at the same time maintaining flexibility.

In addition, the manner of supplying the cuttings and transporting the shaped part described with reference to FIGS. 1-7 does not produce any material particles or splinters caused by the transport mechanism. This contributes to being able to produce high-quality shaped parts with only a small amount of scrap.

Figure 8:
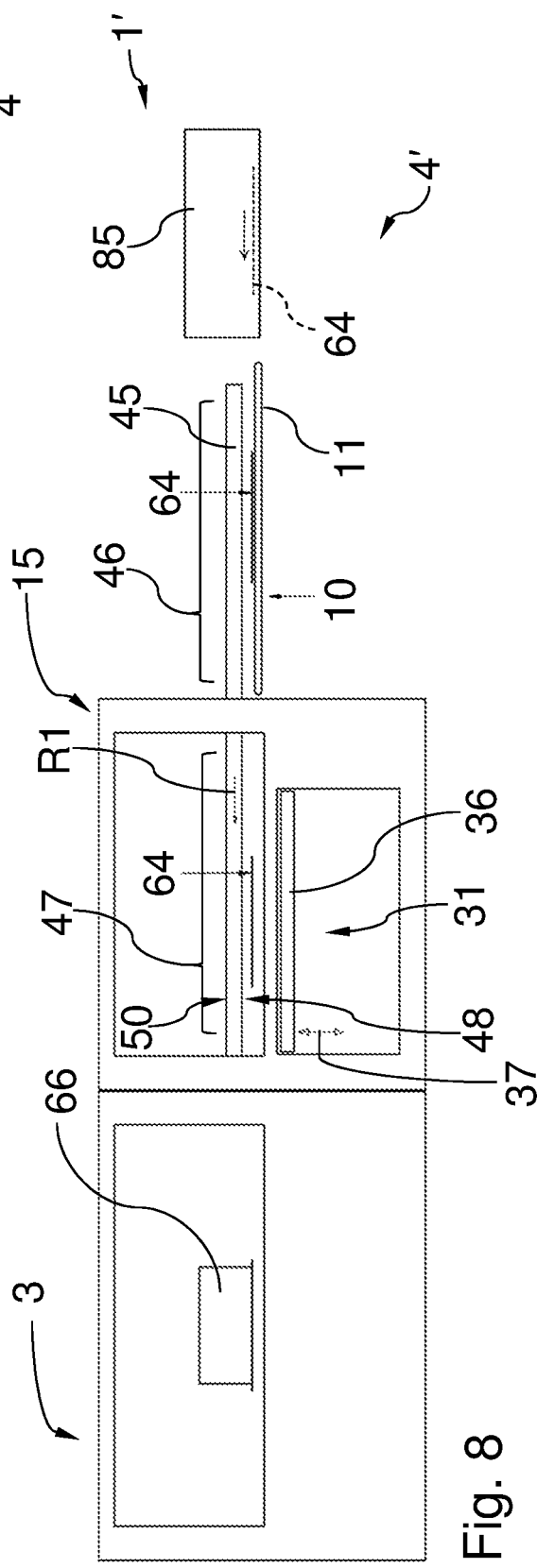
FIG. 8 shows an arrangement according to a further exemplified embodiment.

FIG. 8 shows an arrangement 1' according to a further exemplified embodiment.

The structure and operation of the arrangement 1' are similar to those described in relation to FIGS. 1-7, with the exception of the differences described hereinafter. Here again, an operating mode is possible in which cuttings 64a, 64b, 64c, . . . are provided in an automated manner and successively on the deposition device 10. Furthermore, an operating mode is also possible in which, in a similar manner to FIG. 7, processing of starting material is effected starting from a stack 78.

However, in contrast to FIGS. 1-7, the arrangement 4' of the arrangement 1' has neither the unrolling device 19 nor the separating device 28. Instead, as shown in FIG. 8, a further work station 85 can be located upstream of the deposition device 10, although the work station 85 is not absolutely necessary. Individual plate or film cuttings 64 of plate goods, in particular formed with a thermoplastic plastics material, are successively provided from an external source, pass through the work station 85 in the example shown in FIG. 8, which may be e.g. a cleaning device, and then arrive onto the deposition device 10. The deposition device 10 is again equipped by way of example with a belt-like transport device 11. Further processing of the cuttings 64 is effected in a similar manner to the operation described in relation to FIGS. 1-6. If the arrangement 1' is operated in the mode of operation of FIG. 7, provision can be made for the work station 85, if present, to be switched off or placed in an idle state and for no cuttings 64 to be conveyed to the deposition device 10 from the external source.

It should also be mentioned that in an example variant of the exemplified embodiment of FIGS. 1-7, a work station 85 could also be additionally provided between the separating device 28 and the deposition device 10, if necessary.

Although in the foregoing, the deposition devices 10 are preferably described as being formed having a transport device 11, it is understood that in variants of the above exemplified embodiments, the deposition device 10 can in each case be formed as a table with a deposition surface which is not intended to be moved during operation.

Although the invention has been described in full above with the aid of preferred exemplified embodiments, it is not limited thereto but can be modified in diverse ways.

LIST OF REFERENCE SIGNS

1, 1' arrangement for thermoforming
3 thermoforming machine
4, 4' arrangement for supplying a semi-finished product
6 starting material
10 deposition device
11 transport device
15 loading device
19 unrolling device
21 roll
28 separating device
31 table device
36 table
37 direction of movement (table)
45 loading unit
46 first section
48 second section
48 underside (loading unit)

49 receiving means
50 upper side (loading unit)
55 working region (thermoforming machine)
64 cutting
64a-c cutting
65 cutting
66 shaped part
78 stack
85 work station
B floor
E insertion plane
H horizontal direction
V vertical direction
R1 first direction of movement (loading unit)
R2 second direction of movement (loading unit)

The invention claimed is:

1. Arrangement (4; 4') for supplying a semi-finished product to a thermoforming machine (3) as a starting material (6) for thermoforming,
   wherein the arrangement (4; 4') has a deposition device (10), on which cuttings (64a-c; 64) of the starting material (6) can be provided in each case, and a loading device (15) having a table device (31) and a movable loading unit (45);
   wherein the loading unit (45) is configured as a movable loading carriage and has a first section (46) and a second section (47), wherein the first and second sections (46, 47) are each arranged for receiving one of the cuttings (64a-c; 64) at the section (46, 47) such that the loading unit (45) has two stations, formed by the first and second sections (46, 47), for each receiving one of the cuttings (64a-c; 64), and wherein at least one of the cuttings (64a-c; 64) can be deposited on the table device (31);
   wherein the first section (46) can be positioned to receive one of the cuttings (64a-c; 64) from the deposition device (10) and the second section (47) can be positioned to receive another of the cuttings (64a-c; 64) from the table device (31), and then the first section (46) can be positioned to deposit one cutting (64a-c; 64) received from the deposition device (10) on the table device (31) and the second section (47) can be positioned to deposit the other cutting (64a-c; 64) received from the table device (31) in a working region (55) of the thermoforming machine (3);
   wherein the first and second sections (46, 47) are positionable by moving the loading unit (45), are provided in a mutually fixed spatial arrangement on the loading unit (45) and are movable jointly with one another during operation of the arrangement (4; 4''); and
   wherein the first and second sections (46, 47) of the loading unit (45) are arranged one behind the other along a direction of movement (R1, R2) of the loading unit (45).

2. Arrangement as claimed in claim 1,
   wherein the arrangement (4) has an unrolling device (19) for unrolling rolled goods, which is arranged upstream of the deposition device (10).

3. Arrangement as claimed in claim 2,
   wherein the arrangement (4) has a separating device (28) which is arranged for separating a piece of the rolled goods which has been unrolled in sections by means of the unrolling device (19) and has been deposited at least in sections on the deposition device (10) in order to form the cuttings (64a-c) of the starting material (6).

4. Arrangement as claimed in claim 1, wherein the arrangement (4') is configured for providing the cuttings (64) of the starting material (6) on the deposition device (10) in each case as a cutting of plate goods.

5. Arrangement as claimed in claim 1, wherein the loading unit (45) is movably arranged in such a way that, in a first position of the loading unit (45), the first section (46) of the loading unit (45) is positioned for receiving one (64b) of the cuttings (64a-c; 64) from the deposition device (10) and, at the same time, the second section (47) of the loading unit (45) is positioned for receiving the other (64a) of the cuttings (64a-c; 64) from the table device (31), and/or that the loading unit (45) is movably arranged in such a way that, in a second position of the loading unit (45), the first section (46) of the loading unit (45) is positioned for depositing one cutting (64b) on the table device (31) and, at the same time, the second section (47) of the loading unit (45) is positioned for depositing the other cutting (64a) in the working region (55) of the thermoforming machine (3).

6. Arrangement as claimed in claim 1, wherein the movable loading unit (45) is movable above the table device (31) and the deposition device (10).

7. Arrangement as claimed in claim 1, wherein the cuttings (64a-c; 64) can be received at the first and the second section (46, 47) of the loading unit (45) in each case at an underside (48) of the loading unit (45) and that for this purpose the loading unit (45) is equipped with receiving means (49) in the region of the underside (48) thereof.

8. Arrangement as claimed in claim 1, wherein the loading device (15) is designed and arranged such that the second section (47) of the movable loading unit (45) can be displaced into the working region (55) of the thermoforming machine (3).

9. Arrangement as claimed in claim 1, wherein the loading device (15) is designed in such a way that a shaped part (66) which is produced by means of thermoforming from a cutting (64a-c; 64) deposited beforehand in the working region (55) of the thermoforming machine (3) and is then demoulded can be deposited on an upper side (50) of the loading unit (45), in that position of the loading unit (45) in which the loading unit (45) is positioned for depositing the other cutting (64a-c; 64) in the working region (55) of the thermoforming machine (3).

10. Arrangement as claimed in claim 1, wherein the deposition device (10) is designed having a transport device (11).

11. Arrangement as claimed in claim 1, wherein the table device (31) of the loading device (15) is designed having a movable table (36) which can be moved substantially along a vertical direction (V).

12. Arrangement (1; 1') for thermoforming with a thermoforming machine (3), as well as with an arrangement (4; 4') as claimed in claim 1 in order to supply a semi-finished product to the thermoforming machine (3) as a starting material (6) for thermoforming.

13. Arrangement as claimed in claim 3, wherein the separating device (28) is a cutting device.

14. Arrangement as claimed in claim 6, wherein the movable loading unit (45) is movable above the table device (31) and the deposition device (10) along a substantially horizontal direction (H).

* * * * *